United States Patent

Liu et al.

[11] Patent Number: 5,905,999
[45] Date of Patent: May 18, 1999

[54] CACHE SUB-ARRAY ARBITRATION

[75] Inventors: Peichun Peter Liu; Salim Ahmed Shah; Rajinder Paul Singh, all of Austin, Tex.

[73] Assignee: International Business Machines Corporation, Armonk, N.Y.

[21] Appl. No.: 08/638,661

[22] Filed: Apr. 29, 1996

[51] Int. Cl.⁶ ................................................. G06F 12/08
[52] U.S. Cl. ........................ 711/151; 711/146; 711/158; 711/217
[58] Field of Search ............................. 365/200, 189.04; 395/455, 449, 288, 464, 403, 496, 473, 421.1; 711/128, 122, 137, 3, 169, 146

[56] References Cited

U.S. PATENT DOCUMENTS

| | | | |
|---|---|---|---|
| 4,811,306 | 3/1989 | Boning et al. | 365/200 |
| 4,914,582 | 4/1990 | Bryg et al. | 395/455 |
| 5,249,282 | 9/1993 | Segers | 395/449 |
| 5,353,416 | 10/1994 | Olson | 395/288 |
| 5,359,557 | 10/1994 | Aipperspach et al. | 365/189.04 |
| 5,361,391 | 11/1994 | Westberg | 395/464 |
| 5,483,645 | 1/1996 | Tran | 395/403 |
| 5,581,734 | 12/1996 | DiBrino et al. | 395/496 |
| 5,604,865 | 2/1997 | Lentz et al. | 395/311 |
| 5,640,534 | 6/1997 | Liu et al. | 395/473 |
| 5,649,144 | 7/1997 | Gostin et al. | 395/421.1 |

*Primary Examiner*—Tod R. Swann
*Assistant Examiner*—Fred F. Tzeng
*Attorney, Agent, or Firm*—Kelly K. Kordzik; Winstead Sechrest & Minick P.C.; Anthony V. S. England

[57] ABSTRACT

A cache sub-array arbitration circuit for receiving a plurality of address operands from a pending line of processor instructions in order to pre-fetch data needed in any memory access request in the pending instructions. The sub-array arbitration circuit compares at least two addresses corresponding to memory locations in the cache, and determines in which sub-arrays the memory locations reside. If the two memory locations reside in the same sub-array, the arbitration circuit sends the higher priority address to the sub-array. If a received address operand is the real address of a cache miss, the arbitration circuit sends the cache miss address to the sub-array before other pre-fetch memory access request.

23 Claims, 6 Drawing Sheets

CACHE SUB-ARRAY ARBITRATION

CROSS-REFERENCE TO RELATED APPLICATIONS

This application for patent is related to the following applications for patent:

PRE-FETCHING DATA FROM MEMORY ACROSS PAGE BOUNDARIES, U.S. patent application Ser. No. 08/529,470;

CACHE CONTROLLED INSTRUCTION PRE-FETCHING, U.S. patent application Ser. No. 08/531,948;

PROGRESSIVE DATA CACHE, U.S. patent application Ser. No. 08/519,031;

MODIFIED L1/L2 CACHE INCLUSION FOR AGGRESSIVE PRE-FETCH, U.S. patent application Ser. No. 08/518,348;

STREAM FILTER, U.S. patent application Ser. No. 08/519,032;

CACHE DIRECTORY FIELD FOR INCLUSION, U.S. patent application Ser. No. 08/518,347; and HIGH SPEED MULTIPLE PORT INTERLEAVED CACHE WITH ARBITRATION OF MULTIPLE ACCESS ADDRESSES, U.S. patent application Ser. No. 08/638,655 (Attorney Docket No. AT9-94-210).

These applications for patent are hereby incorporated by reference in the present disclosure as if fully set forth herein.

TECHNICAL FIELD

The disclosure relates in general to data processing systems and, in particular, to processing systems that can fetch more than one instruction at a time from different sub-arrays within the same cache memory.

BACKGROUND INFORMATION

In modern microprocessor systems, processor cycle time continues to decrease as technology continues to improve. Also, design techniques of speculative execution, deeper pipelines, more execution elements and the like, continue to improve the performance of processing systems. The improved performance puts a heavier burden on the memory interface since the processor demands data and instructions more rapidly from memory. To increase the performance of processing systems, cache memory systems are often implemented.

Processing systems employing cache memories are well known in the art. Cache memories are very high-speed memory devices that increase the speed of a data processing system by making current programs and data available to a processor (also referred to herein as a "CPU") with a minimal amount of latency. Large on-chip caches (L1, or primary, caches) are implemented to help reduce the memory latency, and they are often augmented by larger off-chip caches (L2, or secondary, caches).

The primary advantage behind cache memory systems is that by keeping the most frequently accessed instructions and data in the fast cache memory, the average memory access time of the overall processing system will approach the access time of the cache. Although cache memory is only a small fraction of the size of main memory, a large fraction of memory requests are successfully found in the fast cache memory because of the "locality of reference" property of programs. This property holds that memory references during any given time interval tend to be confined to a few localized areas of memory.

The basic operation of cache memories is well-known. When the CPU needs to access memory, the cache is examined. If the word addressed by the CPU is found in the cache, it is read from the fast memory. If the word addressed by the CPU is not found in the cache, the main memory is accessed to read the word. A block of words containing the word being accessed is then transferred from main memory to cache memory. In this manner, additional data is transferred to cache (pre-fetched) so that future references to memory will likely find the required words in the fast cache memory.

The average memory access time of the computer system can be improved considerably by use of a cache. The performance of cache memory is frequently measured in terms of a quantity called "hit ratio." When the CPU accesses memory and finds the word in cache, a cache "hit" results. If the word is found not in cache memory but in main memory, a cache "miss" results. If the CPU finds the word in cache most of the time, instead of main memory, a high hit ratio results and the average access time is close to the access time of the fast cache memory.

Pre-fetching techniques are often implemented to try to supply memory data to the on-chip L1 cache ahead of time to reduce latency. Ideally, data and instructions are pre-fetched far enough in advance so that a copy of the instructions and data is always in the L1 cache when the processor needs it. Pre-fetching of instructions and/or data is well-known in the art. However, existing pre-fetching techniques often pre-fetch instructions and/or data prematurely. The problem with pre-fetching and then not using the pre-fetched instructions and/or data is two-fold. First, the pre-fetched data may have displaced data needed by the processor. Second, the pre-fetch memory accesses may have caused subsequent processor cache reloads to wait for the pre-fetch accesses, thus increasing the latency of needed data. Both of these effects lower the efficiency of the CPU.

Furthermore, when aggressively pre-fetching data to an L1 cache, speculatively pre-fetched data can displace lines in the L2 cache that may be needed in the near future. This may occur even when the pre-fetched line may not be frequently used, may not be modified with a store operation, or may not be used at all by the program (in the case of a bad guess pre-fetch). Also, data pre-fetched to the L1 cache in an aggressive pre-fetch scheme can thrash with (displace) data in the L2 cache.

In state-of-the-art cache memories, more than one memory access is usually performed in a single cycle. This is accomplished by implementing the cache memory in multiple arrays or "sub-arrays". If multiple addresses arrive at the cache memory together, the address originating from the highest priority source is selected for each sub-array. If only one address is destined for a sub-array, no priority determination is needed.

Some impediments to aggressive fetching are related to the method of address generation. In many architectures, addresses are generated for a memory access by operating on address operands arithmetically. For example, a load operation may require that two operands be added together to form the effective address of the memory data to be fetched. One address operand may be one read from General Purpose Register (GPR) A and the other from GPR B. The add operation must be performed in order to obtain the effective address (EA) in memory.

The address generation, however, is a cycle limiter in an aggressive implementation. If two such load operations are attempted together, two separate addition operations (EA0=

GPR A+GPR B and EA1=GPR C+GPR D) have to be performed to obtain the two EAs and then the EAs must be examined to determine if the same sub-array in the cache is being accessed by each EA. If the same sub-array is being accessed, then the EAs must be arbitrated to determine which receives priority. It is advantageous to minimize the amount of time it takes to arbitrate between cache sub-arrays.

SUMMARY OF THE INVENTION

The present invention receives the operand data involved in the sub-array selection and duplicates the arithmetic operation on the operands within the arbitration circuitry. An embodiment of the present invention comprises a sub-array arbitration circuit for arbitrating between at least two memory accesses received by the cache memory. The sub-array arbitration circuit comprises a first adder for receiving a first address and a second address and generating a first effective address associated with a first memory location in the cache memory and a second adder for receiving a third address and a fourth address and generating a second effective address associated with a second memory location in the cache memory. The sub-array arbitration further comprises a priority circuit for determining if the first memory location and the second memory location reside in separate sub-arrays of the cache memory. If the first memory location and the second memory location do reside in separate sub-arrays, the sub-array arbitration circuit sends the first effective address to a first sub-array and sends the second effective address to a second sub-array.

In another embodiment of the present invention, there is disclosed an arbitration circuit for arbitrating between a first memory access request and a second memory access request received by a cache memory containing a plurality of sub-arrays, the arbitration circuit comprising a first adder for receiving a first address and a second address associated with the first memory access request and generating a first effective address associated with a first memory location in the cache memory; circuitry for receiving a third address associated with the second memory access request for accessing a second memory location in the cache memory; and priority determination circuitry for determining if the first memory location and the second memory location are located in separate sub-arrays of the cache memory. The sub-array arbitration further comprises a priority circuit for determining if the first memory location and the second memory location reside in separate sub-arrays of the cache memory. If the first memory location and the second memory location do reside in separate sub-arrays, the sub-array arbitration circuit sends the first effective address to a first sub-array and sends the third address to a second sub-array.

The foregoing has outlined rather broadly the features and technical advantages of the present invention in order that the detailed description of the cache sub-array arbitration circuit that follows may be better understood. Additional features and advantages of the cache sub-array arbitration circuit will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

The principles of the present invention and their advantages are best understood by referring to the illustrated embodiments depicted in FIGS. 1–6 of the drawings, in which like numbers designate like parts.

Figure 1:
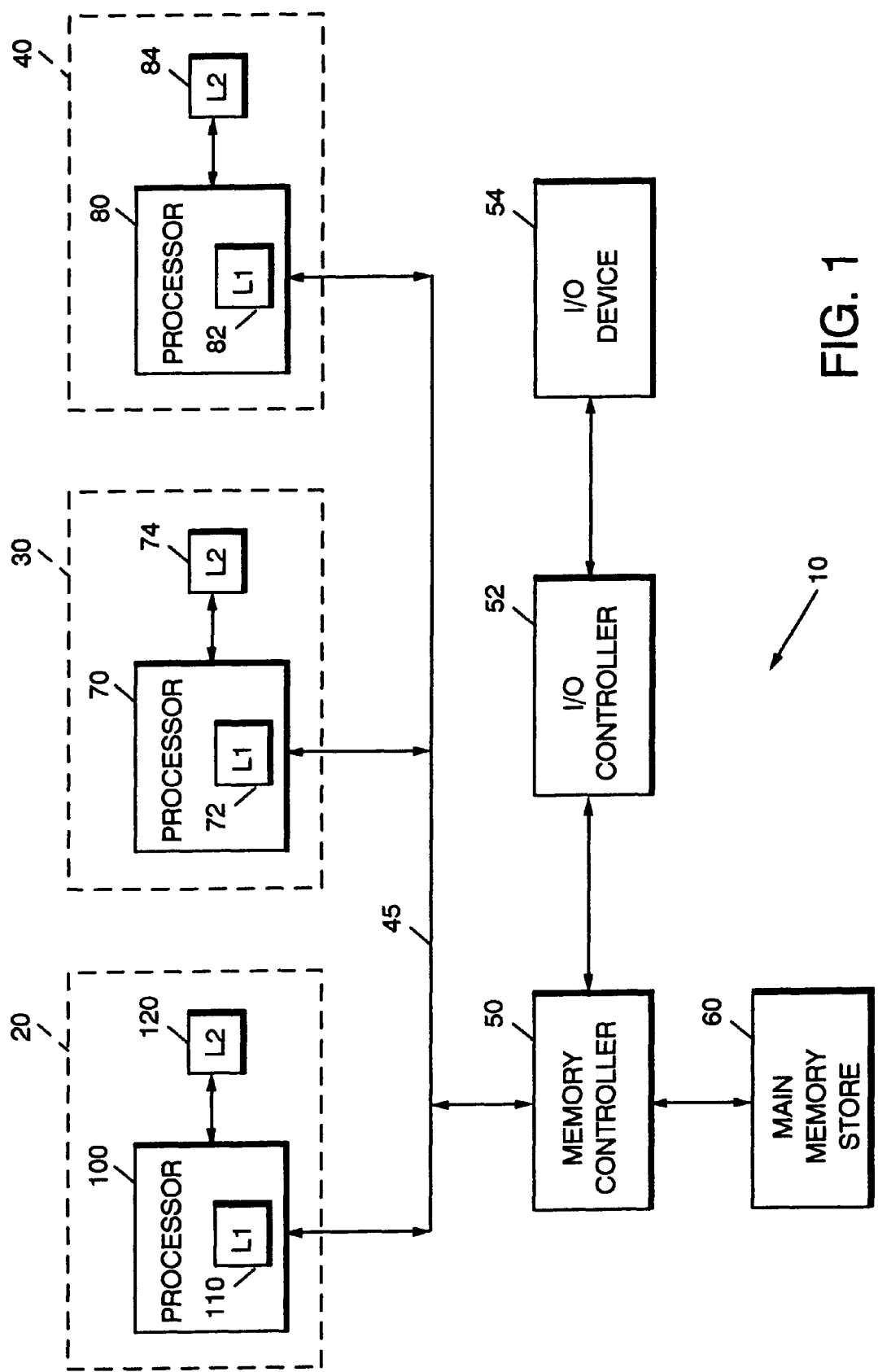
FIG. 1 is a block diagram of a processing system in accordance with the present invention.

Referring now to FIG. 1, a processing system which advantageously embodies the present invention is depicted. Multiprocessor system 10 includes a number of processing units 20, 30 and 40 operatively connected to system bus 45. Note that any number of processing units may be utilized within multiprocessor system 10. Also connected to system bus 45 is memory controller 50, which controls access to main memory store 60. Memory controller 50 is also coupled to input/out (I/O) controller 52, which is coupled to I/O device 54. Processing units 20, 30 and 40, I/O controller 52, and I/O device 54 may all be referred to as bus devices herein. As shown, each processor unit 20, 30 and 40 may include a processor and L1 caches 110, 72, and 82, respectively. The L1 (primary) caches may be located on the same chip as the respective processor. In one embodiment, the L1 caches contain sub-array arbitration circuits according to the present invention. Coupled to processing units 20, 30 and 40 are L2 (secondary) caches 120, 74 and 84, respectively. Each L2 cache is connected to system bus 45 via the processor to which it is attached.

Each L1 and L2 cache pair are normally serially related. The L1 cache may be implemented as store-in or write-through, while the larger and slower L2 cache is implemented as a write-back cache. Both the L1 and L2 cache controllers are physically implemented as part of the processing unit, and are connected via buses internal to the processing unit. Alternatively, the L2 cache controller could be off-chip.

Figure 2:
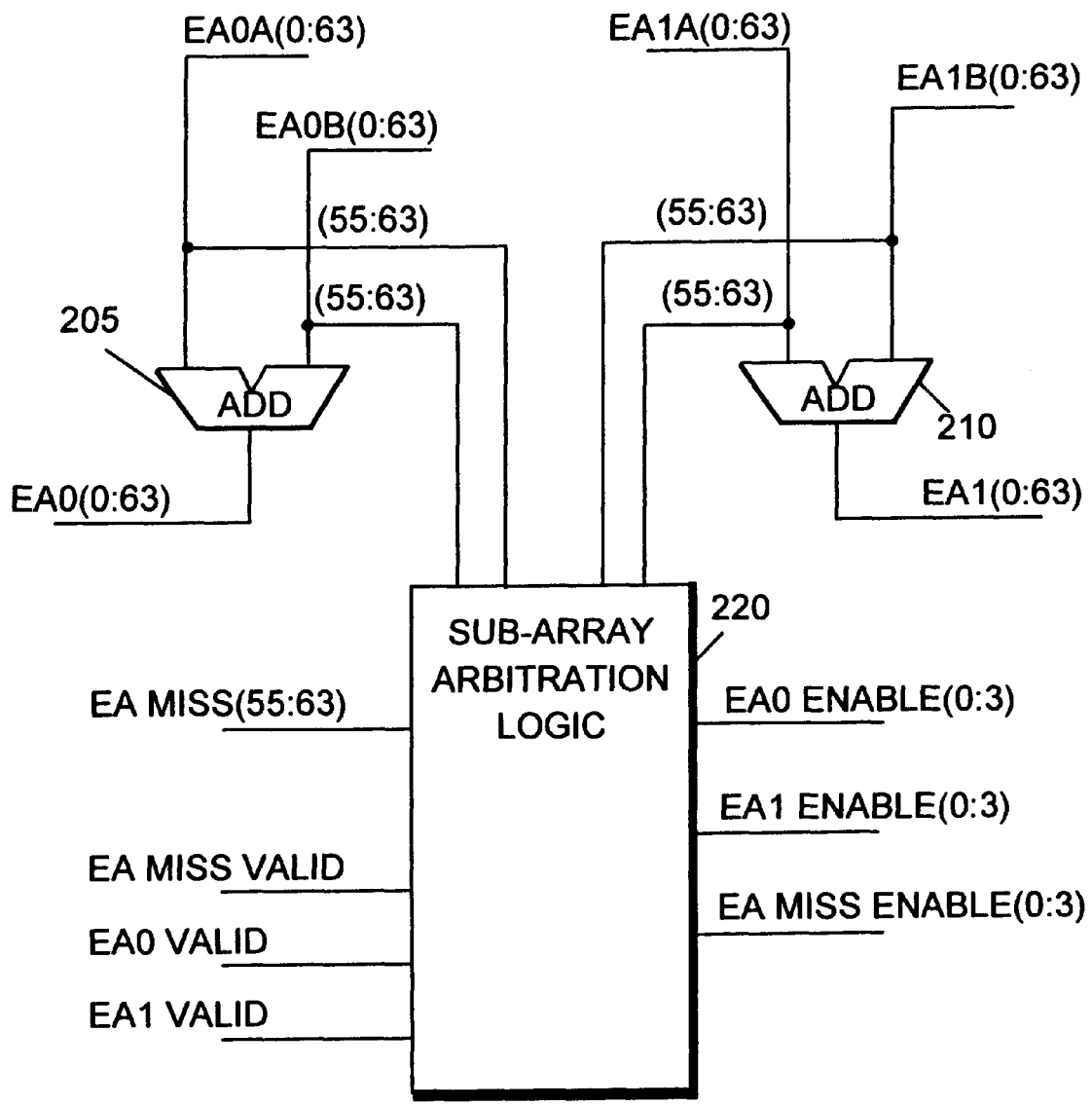
FIG. 2 is a high level block diagram of a cache sub-array arbitration circuit in accordance with the present invention.

FIG. 2 depicts cache sub-array arbitration logic circuit 220 contained in L1 cache 110. The pending line of instructions is scanned for load operations that may require the addition of the contents of two registers to determine the effective address (EA) of the data to be fetched. In the example shown, two such instructions are found and two pairs of address operands, EA0A, EA0B, EA1A and EA1B, are received from the general purpose registers GPR W, GPR X, GPR Y and GPR Z, respectively (not shown). In some cases, the two pairs of address operands may have common general purpose registers, rather than two different pairs of general purpose registers.

GPR W and GPR X contain 64-bit operands, EA0A(0:63) and EA0B(0:63), that must be added together by adder 205 to form the effective address (EA0). GPR Y and GPR Z contain 64-bit operands, EA1A(0:63) and EA1B(0:63), that must be added together by adder 210 to form the effective address (EA1). Both sets of operands are sent to L1 cache 110 simultaneously. Cache sub-array arbitration logic circuit 220 contains adders that replicate a portion of the addition performed by adders 205 and 210. Cache sub-array arbitration logic circuit 220 also contains logic gates that arbitrate between address bits of EA0, EA1 and EA MISS. Also shown in FIG. 2 are control lines indicating the presence of a valid address operation for each EA (EA0 Valid, EA1 Valid), a third address source, EA MISS, and an EA MISS VALID line. The EA MISS address source is an address bus that can contain the address for a cast-out operation. EA MISS and other address sources are obvious extensions to the basic EA pair. The present invention grants priority to a cache miss (EA MISS) over EA0 and EA1 cache accesses to the same cache sub-array.

In a preferred embodiment, L1 cache 110 is 4-way interleaved. It is well known in the art that a data cache can be addressed by an effective address (EA) and a real address (RA) in the same cycle. EA(55:56) and RA(31:32) select the sub-array. If both the EA and the RA are active and EA(55:56) equal RA(31:32), then the two addresses are said to be in conflict. When both the EA and the RA are accessing the same sub-array, the sub-array arbitration circuit blocks the lower priority address and grants priority address and grants the higher priority address access to the sub-array. The constraint that a sub-array can be accessed by only one address is due to the fact that there is only one pair of bit lines for each memory cell. Consequentially, only one word line per sub-array can be enabled in the sub-array during a single cycle.

In one embodiment of the present invention, the architecture definitions for the Effective Address are: EA(0:35) is the effective segment ID; EA(36:51) is the effective page index; and EA(52:63) is the 4K effective page offset. The effective address is used in the data cache array as follows:

| Not Used | ECAM Tag | Subarray Select | Double Word Select | Byte Offset Not Used |
|---|---|---|---|---|
| EA(0:43) | EA(43:54) | EA(55:56) | EA(57:60) | EA(61:63) |

EA(60) selects even or odd double word. EA(57:59) select 1 of 8 even or odd double words.

In one embodiment of the present invention, the architecture definitions for the Real Address are: RA(0:27) is the real page number; and RA(28:39) is the 4K real page offset. The real address is used in the data cache array as follows:

| RCAM Tag | Subarray Select | Double Word Select | Byte Offset Not Used |
|---|---|---|---|
| RA(0:30) | RA(31:32) | RA(33:36) | RA(37:39) |

RA(36) selects even or odd double word. RA(33:35) select 1 of 8 even or odd double words.

In one embodiment, three EAs can access the cache array in the same cycle. There are two levels of subarray arbitration control. The first level of arbitration controls the EA MUX. The EA MUX selects one of the three EA addresses, EA0, EA1, or EA MISS, to access one of the cache sub-arrays. The second level of arbitration controls the word line access. If the subarray conflict exists between the EAs, the subarray arbitration logic will grant access to the higher priority request and deny the lower priority request.

Figure 3:
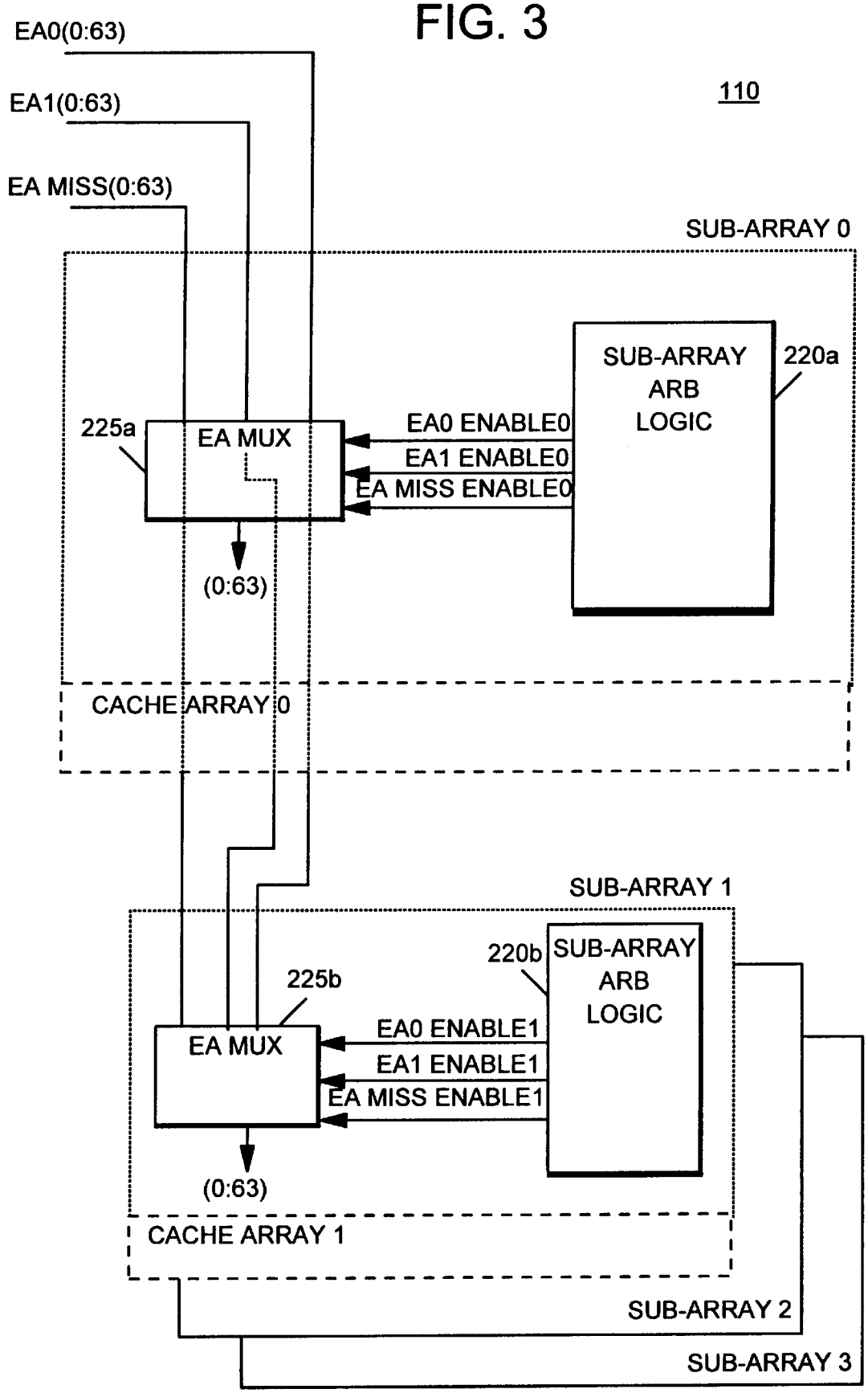
FIG. 3 is a high level block diagram of cache sub-arrays in accordance with the present invention.

FIG. 3 depicts in greater detail the arrangement of four cache sub-arrays, Sub-Array 0–Sub-Array 3. Each sub-array contains a portion of the L1 cache 110 memory array and the arbitration logic (Sub-Array Arbitration Logic 220a–220d) for that sub-array. Each Sub-Array Arbitration Logic 220a–220d controls a multiplexer (EA MUX 225a–225d) that gates one of the effective addresses to the proper cache sub-array. EA0(0:63) and EA1(0:63) are thus presented to the sub-arrays of L1 cache 110 and the correct sub-array of Sub-Array 0–Sub-Array 3 is enabled. EA0 is given priority if both EA0 and EA1 address the same sub-array.

In one embodiment of the invention, L1 cache 110 is 16-way set associative and the line size is 32 bytes. Therefore, the lower 9 address bits, bits 55:63 are used to address a select one of the (16×32)=512 individual bytes. Bits 55 and 56 select the sub-array, bits 57 and 58 select the cache line within each sub-array, and bits 59 through 63 select an individual byte within the 32 bytes of the line. In order to perform sub-array arbitration, only the resulting bits from the addition of bits 55 and 56 (including the carry-in for bit 56) are needed. This present invention utilizes those bits and performs the calculation within the sub-array arbitration logic 220a–d.

As the text accompanying FIGS. 2 and 3 demonstrates, the delay caused by serially performing EA calculation in adders 205 and 210 and then selecting the address to be gated to the sub-array is reduced by calculating in sub-array arbitration logic 220 only the small part of the EA involved in sub-array selection within each sub-array. This calculation produces a selective signal to the EA selector (i.e., EA MUX 225a–225d) in parallel with the full EA address calculation.

Figure 4:
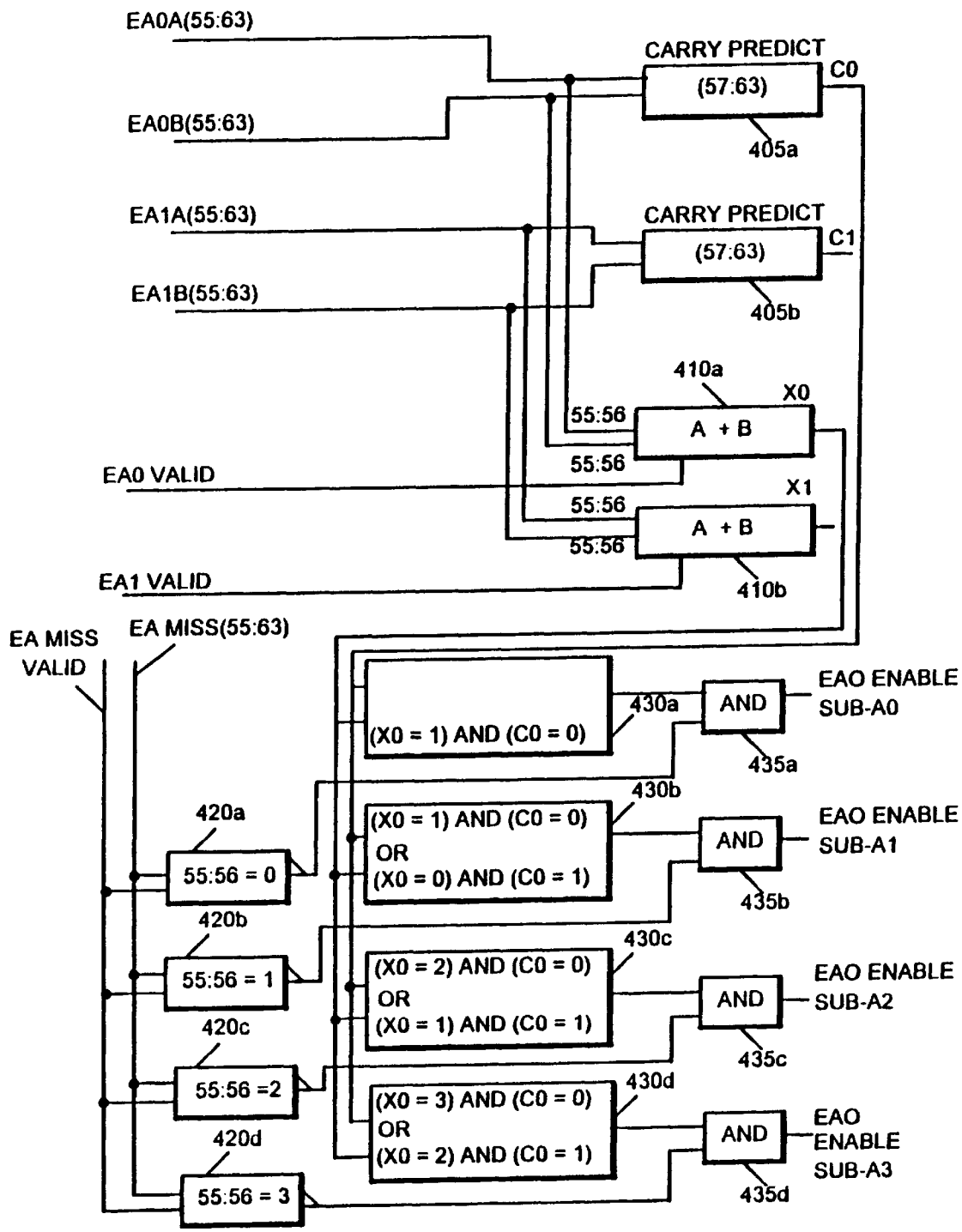
FIGS. 4–6 are a detailed block diagram of a cache sub-array arbitration circuit in accordance with the present invention.
Figure 5:
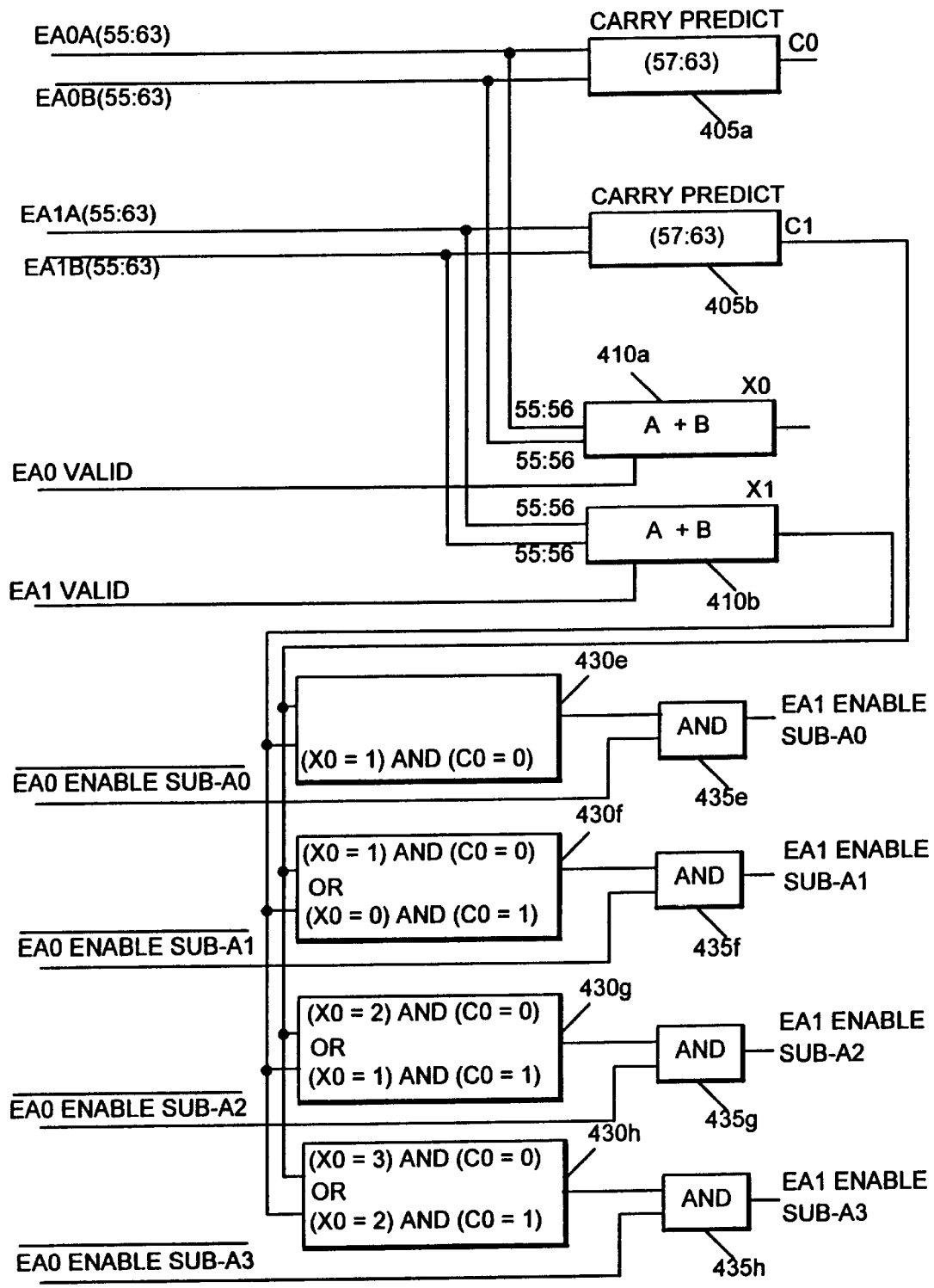

FIGS. 4 and 5 depict in detail the arithmetic logic for selecting EA0 and EA1. In FIG. 4, the two address operands to be added to obtain EA0 are EA0A(0:63) and EA0B(0:63). A partial sum, X0, is created in adder 410 for EA0 if EA0 is valid. Carry predict logic 405 predicts the bit 56 carry-in, C0. C0 and X0 are used to determine to which sub-array EA0 is directed. EA1 has lower priority than EA0. Therefore, the EA0 sub-array enable signals, EA0 Enable Sub-A1 through EA0 Enable Sub-A3, are used to disable the EA1 sub-array enable signals. In FIG. 4, EA Miss logic circuits 420 and 435 are shown, since a cast-out operation would take priority over both EA0 and EA1 operations.

Figure 6:
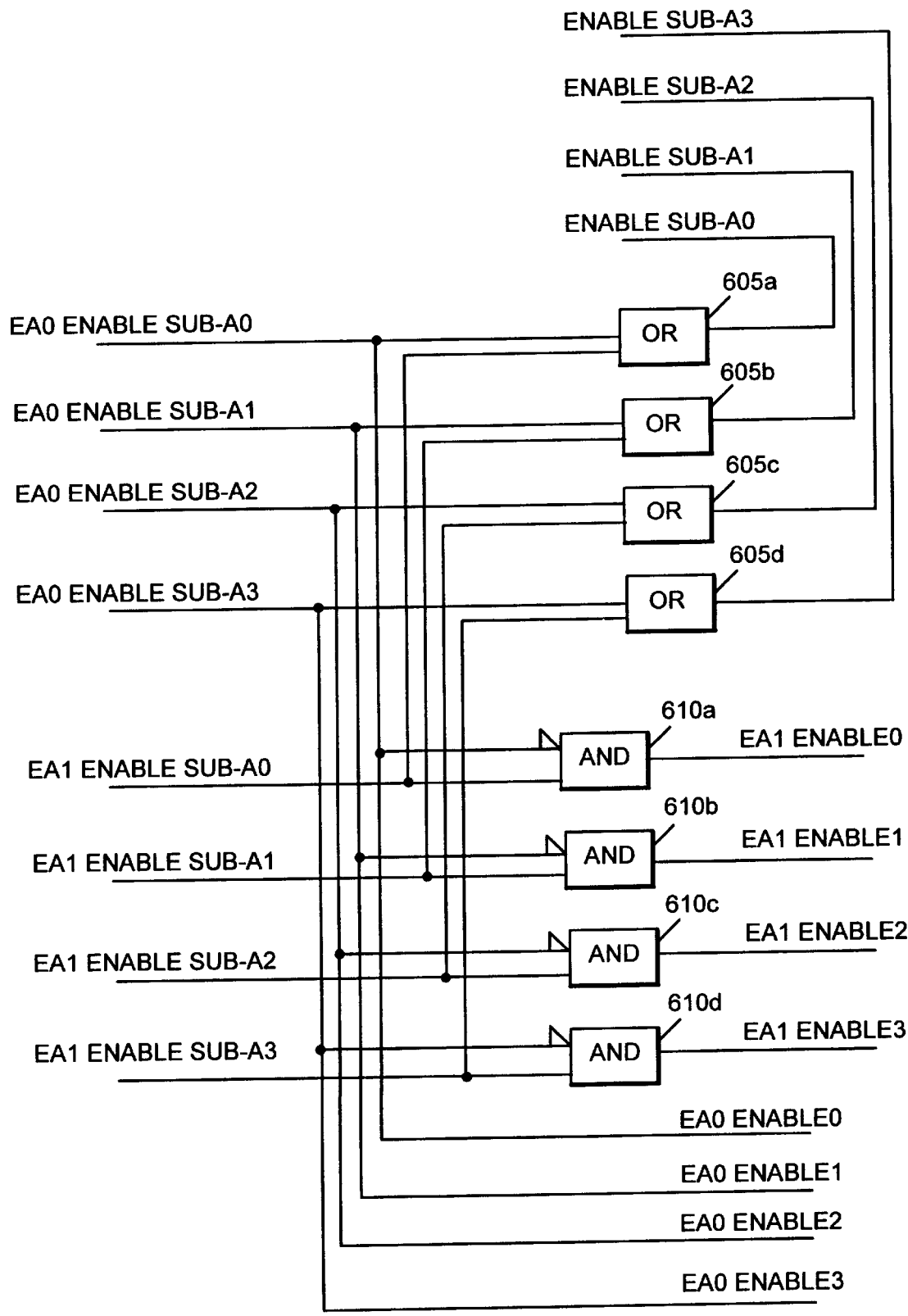

FIG. 6 depicts AND and OR logic used to generate the enable signals for EA MUX 225a–d are generated along with the sub-array enable line. For Sub-Array 1 for instance, multiplexer EA MUX 225b uses the signals EA0 ENABLE SUB-A1 or EA1 ENABLE SUB-A1 to generate EA0 ENABLE 1 or EA1 ENABLE 1. The sub-array is enabled by Enable Sub-A1. FIG. 6 describes only EA0 and EA1 bus arbitration for clarity, the EA Miss bus is omitted.

Although the present invention and its advantages have been described in detail, it should be understood that various changes, substitutions and alterations can be made herein without departing from the spirit and scope of the invention as defined by the appended claims.

What is claimed is:

1. In a cache memory containing a plurality of sub-arrays, an arbitration circuit for arbitrating between a first memory access request and a second memory access request received by said cache memory, said arbitration circuit comprising:

a first adder for receiving a first address and a second address associated with said first memory access request and generating a first partial effective address associated with a first memory location in said cache memory;

a second adder for receiving a third address and a fourth address associated with said second memory access request and generating a second partial effective address associated with a second memory location in said cache memory; and priority determination circuitry for determining if said first memory location and said second memory location are located in separate sub-arrays of said cache memory.

2. The arbitration circuit in claim 1 wherein said arbitration circuit, in response to a determination that said first memory location and said second memory location are located in separate sub-arrays, causes said first memory access request to access said first memory location and said second memory access request to access said second memory location.

3. The arbitration circuit in claim 1 wherein said arbitration circuit, in response to a determination that said first memory location and said second memory location are located in the same sub-array, causes said first memory access request to access said first memory location.

4. The arbitration circuit in claim 1 wherein said cache memory contains 4 sub-arrays.

5. The arbitration circuit in claim 1 wherein said first address and said second address are effective addresses corresponding to said first memory location, and wherein said third address and said fourth address are effective addresses corresponding to said second memory location.

6. The arbitration circuit in claim 1, wherein the priority determination circuitry receives the first and second partial effective addresses and determines from a comparison of these first and second partial effective addresses if said first memory location and said second memory location are located in separate sub-arrays of said cache memory.

7. The arbitration circuit as recited in claim 6 wherein said priority determination circuitry outputs an output signal in response to the determination if said first memory location and said second memory location are located in separate sub-arrays of said cache memory, further comprising:
a multiplexor receiving the first and second memory access requests and outputting one of the first and second memory access requests in response to receipt of the output signal.

8. In a cache memory containing a plurality of sub-arrays, an arbitration circuit for arbitrating between a first memory access request and a second memory access request received by said cache memory, said arbitration circuit comprising:
a first adder for receiving a first address and a second address associated with said first memory access request and generating a first partial effective address associated with a first memory location in said cache memory;
circuitry for receiving a third address associated with said second memory access request for accessing a second memory location in said cache memory; and
priority determination circuitry for determining if said first memory location and said second memory location are located in separate sub-arrays of said cache memory.

9. The arbitration circuit in claim 8 wherein said arbitration circuit, in response to a determination that said first memory location and said second memory location are located in separate sub-arrays, causes said first memory access request to access said first memory location and said second memory access request to access said second memory location.

10. The arbitration circuit in claim 9 wherein said arbitration circuit, in response to a determination that said first memory location and said second memory location are located in the same sub-array, causes said first memory access request to access said first memory location.

11. The arbitration circuit in claim 10 wherein said first address and said second address are effective addresses corresponding to said first memory location.

12. The arbitration circuit in claim 11 wherein said third address is a real address corresponding to a cache miss operation.

13. A processing system comprising:
a processor;
a main memory coupled to said processor; and
a cache memory associated with said processor, wherein said cache memory includes an arbitration circuit comprising:
a first adder for receiving a first address and a second address associated with a first memory access request from said processor and generating a first partial effective address associated with a first memory location in said cache memory;
a second adder for receiving a third address and a fourth address associated with a second memory access request from said processor and generating a second partial effective address associated with a second memory location in said cache memory; and
priority determination circuitry for determining if said first memory location and said second memory location are located in separate sub-arrays of said cache memory.

14. The processing system in claim 13 wherein said arbitration circuit, in response to a determination that said first memory location and said second memory location are located in separate sub-arrays, causes said first memory access request to access said first memory location and said second memory access request to access said second memory location.

15. The processing system in claim 13 wherein said arbitration circuit, in response to a determination that said first memory location and said second memory location are located in the same sub-array, causes said first memory access request to access said first memory location.

16. The processing system in claim 13 wherein said first address and said second address are effective addresses corresponding to said first memory location.

17. The arbitration circuit in claim 13 wherein said third address and said fourth address are effective addresses corresponding to said second memory location.

18. In a data processing system comprising a processor and a cache memory associated with said processor, a method comprising the steps of:
receiving from said processor a first address and a second address associated with a first memory access request and generating a first effective address associated with a first memory location in said cache memory;
receiving from said processor a third address associated with a second memory access request for accessing a second memory location in said cache memory; and
determining if said first memory location and said second memory location are located in separate sub-arrays of said cache memory.

19. The method in claim 18 further comprising the step of:
in response to a determination that said first memory location and said second memory location are located in separate sub-arrays, causing said first memory access request to access said first memory location and said second memory access request to access said second memory location.

20. The method in claim 18 further comprising the step of:
in response to a determination that said first memory location and said second memory location are located in the same sub-array, causing said first memory access request to access said first memory location.

21. The method in claim 18 wherein said first address and said second address are effective addresses corresponding to said first memory location.

22. The method in claim 18 wherein said third address is a real address corresponding a cache miss operation.

23. A cache memory comprising:

a first sub-array;

a second sub-array;

a first adder operable for receiving first and second effective addresses associated with a first memory access request and generating a third effective address associated with the first memory access request;

a second adder operable for receiving fourth and fifth effective addresses associated with a second memory access request and generating a sixth effective address associated with the second memory access request;

a first multiplexor, associated with the first sub-array, operable for receiving the third and sixth effective addresses;

a second multiplexor, associated with the second sub-array, operable for receiving the third and sixth effective addresses;

first arbitration logic, associated with the first sub-array, containing (1) a first adder circuit operable for receiving portions of the first and second effective addresses associated with the first memory access request and (2) circuitry, coupled to the first adder circuit, operable for determining whether the first memory access request or the second memory access request corresponds to a memory location in the first sub-array and sending a first output signal to the first multiplexor as a function of this determination; and second arbitration logic, associated with the second sub-array, containing (1) a second adder circuit operable for receiving portions of the fourth and fifth effective addresses associated with the second memory access request and (2) circuitry, coupled to the second adder circuit, operable for determining whether the first memory access request or the second memory access request corresponds to a memory location in the second sub-array and sending a second output signal to the second multiplexor as a function of this determination, wherein the first and second multiplexors are each operable for selecting either the first memory access request or the second memory access request as a function of the first and second output signals, respectfully.

* * * * *